Jan. 1, 1935.  W. G. GERNANDT  1,986,674
INTERNAL COMBUSTION ENGINE
Filed Dec. 3, 1930  3 Sheets-Sheet 3

INVENTOR.
WALDO G. GERNANDT
BY Warren T. Hunt
ATTORNEY

Patented Jan. 1, 1935

1,986,674

UNITED STATES PATENT OFFICE 1,986,674

INTERNAL COMBUSTION ENGINE

Waldo G. Gernandt, Hayward, Calif.

Application December 3, 1930, Serial No. 499,636

3 Claims. (Cl. 123—139)

This invention relates to Diesel engines and more particularly to fuel injection units for Diesel engines wherein the compressor is a complete unit and may be installed in detachable relation to the engine.

One of the objects of the invention is to provide a fuel injection unit in which one compressor cylinder may serve a number of engine cylinders.

Another object of the invention is to provide a fuel injection unit in which the air and fuel are thoroughly mixed and compressed prior to their induction into the engine.

An important feature of the invention relates to the arrangement of driven shafts whereby the compressor piston is driven at some multiple of the engine speed and compressor cylinder is able to deliver the fuel in equal amounts, and under the same compression pressure to a plurality of working engine cylinders.

In the compressor shown in the drawings, the unit is adapted to a four cylinder, four cycle engine, and therefore, the compressor is driven at twice the engine speed and the cam shaft operating the fuel distributor valves is driven at one-half engine speed.

Other important features and objects of the invention relating to the distributor valve system and other details of construction will be apparent from the following description of certain illustrative embodiments which I have shown in the accompanying drawings, in which.

Figure 1:
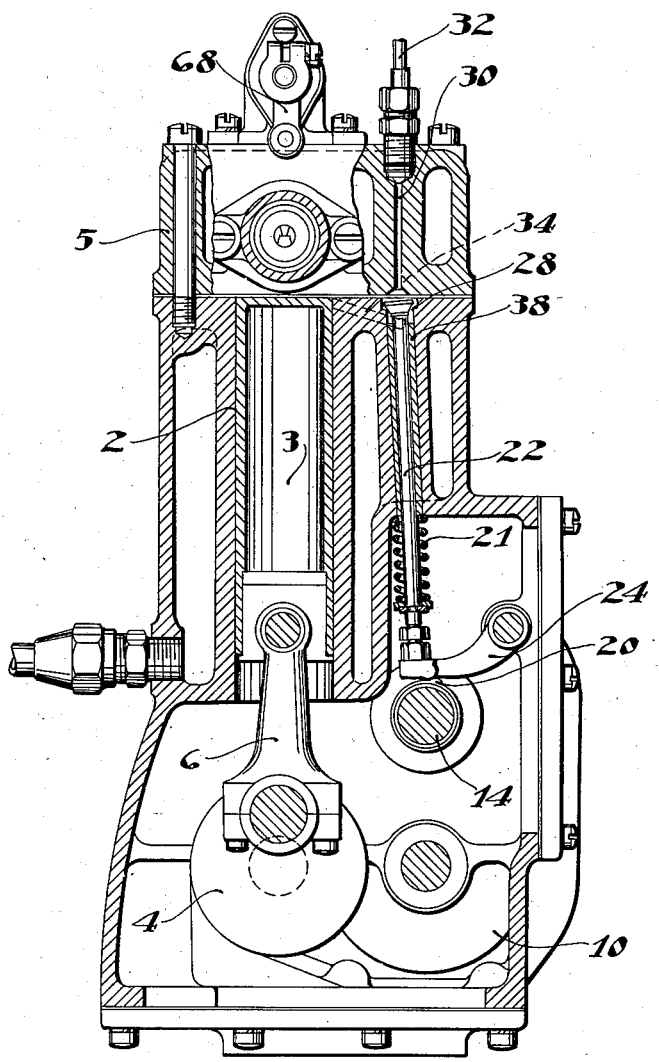
Figure 1 is a front elevation partly in section, of the fuel injection unit showing the arrangement of the drive shafts, and also showing one of the distributor valves.

Referring to the drawings, 1 is a crank case to which is secured the compression cylinder 2, having a removable head 5. Within the cylinder 2 is a reciprocating piston 3 secured to the crank shaft 4 by connecting rod 6. The compressor is connected to the engine (not shown) by driving shaft 8 which in turn drives the crank shaft 4 through gears 10 and 12, gear 12 having twice the number of teeth of gear 10, whereby the crank shaft 4 is rotated at twice the speed of the driven shaft 8.

Above the drive shaft 8 is mounted the cam shaft 14, which is driven by shaft 8 at one-half the speed of shaft 8 through gears 16 and 18. Cam shaft 14 is provided with a series of four cams which are arranged with their lifting faces 20 in angularly spaced intervals of 90° whereby the respective valves 22 are lifted in regular rotation by arms 24 pivotally mounted on case 1. Each of the valves is adapted to control an opening 28 that leads to a conduit 30 in communication with a fitting 32 leading to the working cylinders of the engine (not shown) to which the injection unit is secured.

Leading from the upper end of the compressor cylinder is a transverse passage 34 which intersects a longitudinal passage 36 which communicates with the chamber 28 which is provided underneath each of the respective valves. The passage 36 is preferably drilled through one wall of the cylinder and has its outer end closed by screw 37. An inlet passage 40 leads from a source of supply of exhaust gas or opens directly to the atmosphere, depending upon whether it is desired to charge the engine with a mixture of fuel and inert gas, or a mixture of fuel and atmospheric air.

Figure 2:
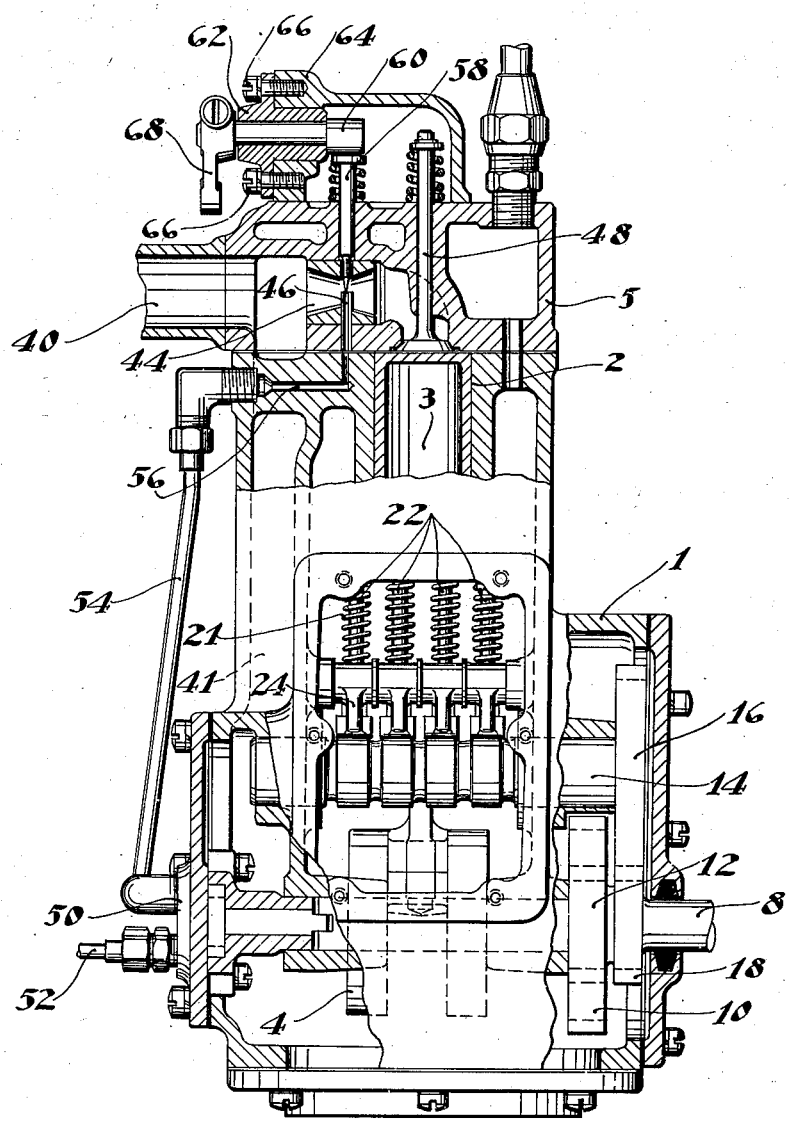
Figure 2 is a side elevation partly in section, showing the distributor valve operating cam shaft.
Figure 3:
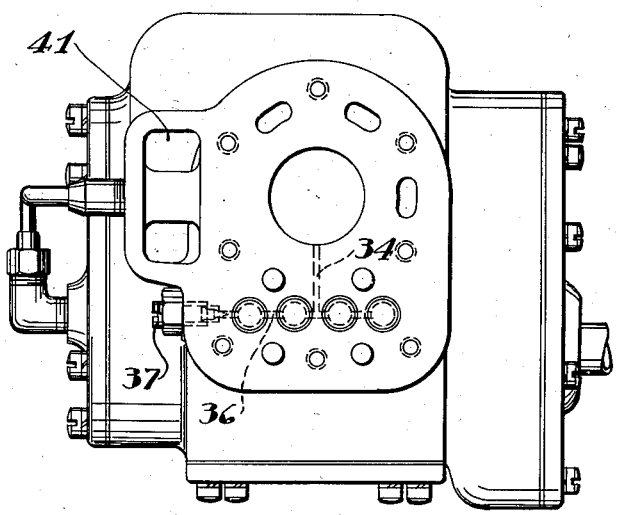
Figure 3 is a top plan view with the compressor head removed.

In the construction shown in Figures 1, 2, and 3 the passage 41 between inlet 40 and the crank case 1 is unobstructed and gas may freely enter the crank case because of the suction produced therein by outward or upward movement of piston 3. The Venturi tube 44 in which is mounted the fuel jet 46 is located adjacent the spring loaded inlet valve 48, and the gas used for atomizing the fuel only traverses the fuel jet opening on its way from the crank case to the cylinder.

The fuel is fed to jet 46 by means of a fuel pump 50 having an inlet 52 and an outlet conduit 54 which leads to the jet 46 by passageway 56 formed in the cylinder casting. The opening of the fuel jet is controlled by needle valve 58 which is controlled by a cam 60 rotatably mounted in bearing 62 secured to the valve cover 64 by screws 66, the shaft being rotated to raise and depress the needle valve by a lever 68.

In the operation of the apparatus thus far described exhaust gas or air is drawn into the crank case by the upward movement of the piston 3, which upon descending, draws the gas upwardly through passage 41 past the fuel jet 46 from which it draws a supply of fuel controlled by the opening of the needle valve 58, and through the valve 48 into the compressor cylinder. The upward movement of the piston 3 compresses the fuel mixture within the cylinder until one of the fuel valves 22 is opened by the cam shaft, whereupon it flows to the working cylinder of the engine that corresponds to the respective distributor valve of the injection unit.

The distributor valves 22 are operated by the cam shaft 14, which rotates at half engine speed and therefore, one of the distributor valves is opened by its respective cam 20 against the resistance of spring 21 during each compression stroke of the piston 3. The arrangement of a single compressor cylinder driven at twice engine speed and a distributor valve mechanism which is driven at one-half the engine speed, permits the use of a single compressor cylinder for a four cylinder engine, and each engine charge is of the same volume and quality, for any leakage which may develop in the compressor will affect all of the engine cylinders equally.

It is important that the compressor be driven in timed relation to the engine, and preferably the unit should be driven at that multiple of engine speed corresponding to the number of firing strokes occurring in one engine revolution. The cam shaft should have the number of its cams correspond to the number of engine cylinders and be driven at a speed that will give one revolution for each complete engine cycle.

Difficulty is often experienced in delivery of unequal charges to the respective cylinders of Diesel engines, and the present invention obviates this difficulty by delivering fuel to all the cylinders from a single source and in which there can be no variation in the quality of fuel and gas delivered to the respective engine cylinders.

Figure 4:
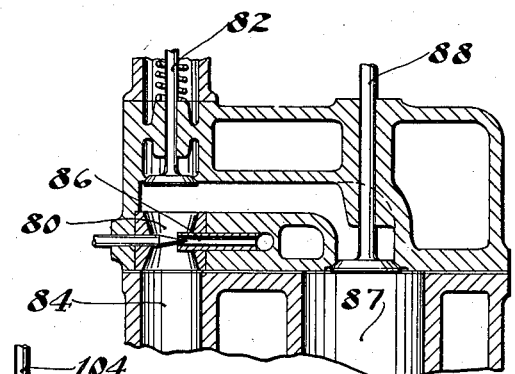
Figure 4 shows a modified form of the unit in which the gases are caused to flow past the fuel jet both on their way to the crank case for the initial compression and to the compressor cylinder for the final compression.

In the modification shown in Figure 4, the Venturi tube 80 is placed between the gas inlet valve 82 and the passage 84 leading to the crank case, and in this construction, the gas will pass fuel jet 86 on its passage to the crank case for the initial compression stage and will repass the fuel jet on its way from passage 84 to the cylinder 86 past the cylinder inlet valve 88 and thereby secure more complete atomization of the fuel and better mixture of the fuel and gas before it enters the cylinder 86 for its final compression stage.

No gas inlet valve corresponding to valve 82 has been shown in Figures 1 to 2, because no fuel is drawn into the crank case, and although there is no tendency for the gas to rush out of the inlet during the downward stroke of the piston, it is obvious that a valve similar to that shown in Figure 4 may be used if desired.

Figure 5:
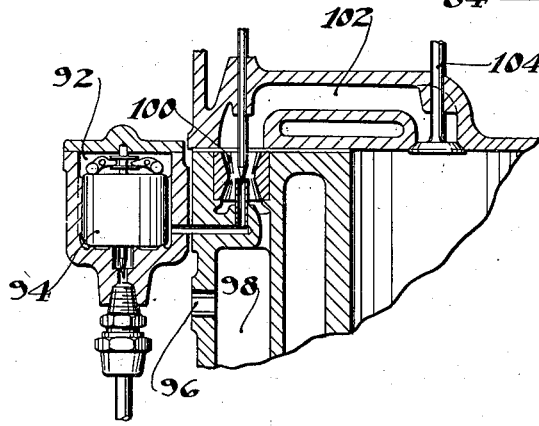
Figure 5 shows still another modification in which the fuel pump is replaced by a float feed fuel chamber.

In the form shown in Figure 5, the fuel pump has been replaced by a constant level fuel chamber 92 in which the fuel lever is controlled by the well-known float mechanism 94. In this form the gas or air enters through port 96, passes downwardly to the crank case through passage 98 and then upwardly through the venturi 100 to the cylinder through passage 102 and valve 104.

In each of the forms illustrated, I preferably use the distributor system illustrated in Figures 1 and 2 and thereby am enabled to utilize a single compressor cylinder for supplying a plurality of working engine cylinders.

While I have shown and described certain embodiments of my invention, it is realized that various changes may be made without departing from the spirit thereof, and I therefore do not regard the invention as limited to the embodiments illustrated and described, or otherwise except as defined by the terms of the following claims:

I claim:

1. A fuel injection unit comprising a compressor cylinder, a crank case therefor, means for drawing a charge of compressible gas into the crank case, means for introducing the crank case charge into the cylinder, means for introducing a charge of fuel into each crank case charge, and means for distributing the compressed and mixed charge through a plurality of outlets from the cylinder.

2. A fuel injection unit comprising a compressor having a cylinder and a crank case, a gas conduit between the cylinder and the crank case, an inlet to said conduit, and a fuel jet in said conduit between the inlet and the crank case.

3. A fuel injection unit comprising a compressor having a cylinder mounted on a crank case, a gas passageway between said cylinder and crank case, a crank case inlet valve, and a fuel jet in the passageway between the inlet valve and the crank case.

WALDO G. GERNANDT.